(12) United States Patent
Watanabe et al.

(10) Patent No.: US 9,778,423 B2
(45) Date of Patent: Oct. 3, 2017

(54) BOOT FOR OPTICAL CONNECTOR FERRULE

(71) Applicant: SANWA DENKI KOGYO CO., LTD., Tokyo (JP)

(72) Inventors: Yasuhiro Watanabe, Tokyo (JP); Atsushi Nishio, Tokyo (JP)

(73) Assignee: SANWA DENKI KOGYO CO., LTD., Tokyo (JP)

( * ) Notice: Subject to any disclaimer, the term of this patent is extended or adjusted under 35 U.S.C. 154(b) by 0 days.

(21) Appl. No.: 15/098,536

(22) Filed: Apr. 14, 2016

(65) Prior Publication Data

US 2016/0356965 A1 Dec. 8, 2016

(30) Foreign Application Priority Data

Jun. 5, 2015 (JP) .................................. 2015-114679

(51) Int. Cl.
*G02B 6/38* (2006.01)

(52) U.S. Cl.
CPC ......... *G02B 6/3861* (2013.01); *G02B 6/3887* (2013.01); *G02B 6/3885* (2013.01)

(58) Field of Classification Search
CPC ................................ G02B 6/38; G02B 6/3874
USPC .......................................................... 385/80
See application file for complete search history.

(56) References Cited

U.S. PATENT DOCUMENTS

| | | | | |
|---|---|---|---|---|
| 5,802,230 A * | 9/1998 | Kuribayashi | ........ | G02B 6/4246 385/88 |
| 5,815,621 A * | 9/1998 | Sakai | ................... | B24B 19/226 264/1.1 |
| 6,913,394 B2 * | 7/2005 | Iwano | ................. | G02B 6/3851 385/60 |
| 7,534,050 B2 * | 5/2009 | Kachmar | ............. | G02B 6/3806 385/55 |
| 2002/0004336 A1 * | 1/2002 | Yamaguchi | .......... | G02B 6/3817 439/577 |
| 2002/0122634 A1 * | 9/2002 | Miyake | ................ | G02B 6/3877 385/78 |
| 2002/0154867 A1 * | 10/2002 | Ohtsuka | ............... | G02B 6/3834 385/78 |
| 2002/0159717 A1 * | 10/2002 | Miyake | .................. | G02B 6/266 385/78 |
| 2016/0324402 A1 * | 11/2016 | Yajima | ................. | G02B 6/3874 385/55 |

FOREIGN PATENT DOCUMENTS

JP 2001083367 A 3/2001

* cited by examiner

*Primary Examiner* — Kaveh C Kianni
(74) *Attorney, Agent, or Firm* — Bacon & Thomas, PLLC

(57) ABSTRACT

In a boot B for an optical connector ferrule including a rear opening portion 21*b* used to insert an optical fiber tape T having an optical fiber at a front end thereinto and a front opening portion 21*a* used to expose the optical fiber of the front end of the inserted optical fiber tape T to the outward front side, the boot is inserted into an insertion opening portion 14 formed at a rear end side of a ferrule body 10 and a surface of the boot B is provided with protrusions 22*a*, 22*b*, and 22*c* formed so as to be crushable when the protrusions are inserted into the insertion opening portion 14 of the ferrule body 10 in a direction orthogonal to the insertion direction of the boot B.

4 Claims, 9 Drawing Sheets

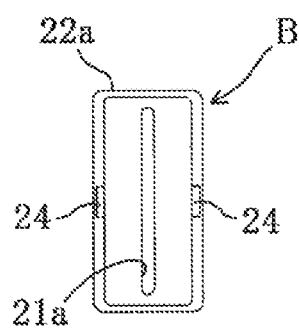
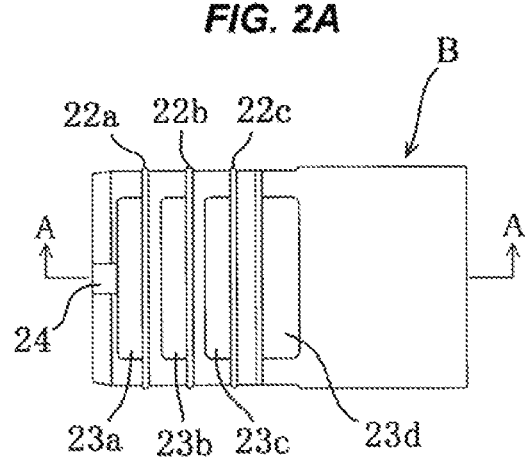
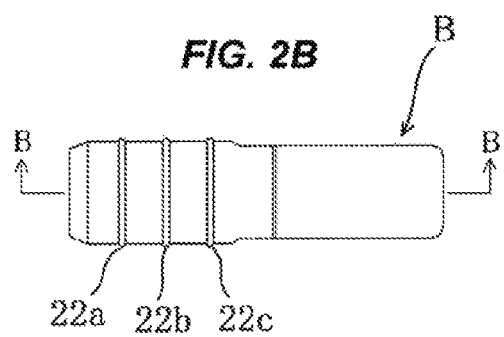
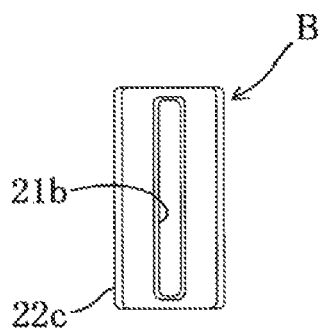
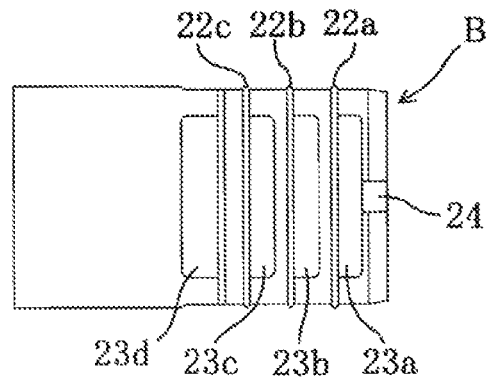

BOOT FOR OPTICAL CONNECTOR FERRULE

TECHNICAL FIELD

The present invention relates to a boot for an optical connector ferrule that forms, for example, a multifiber connector such as a multifiber-push-on connector (hereinafter, referred to as a MPO connector) and a mechanically-transferable-splicing connector (hereinafter, referred to as a MT connector) used to connect an optical fiber and an optical fiber tape core wire.

BACKGROUND ART

Hitherto, as a connector for connecting a SM-type optical fiber single core wire and a tape core wire at low loss, for example, a multifiber connector capable of highly densely connecting optical fibers with high efficiency is used in accordance with the development of a highly dense multi-core cable that stores a single mode type optical fiber tape of four cores, eight cores, twelve cores, or the like. In a connection method, ferrules having a multi-core optical fiber positioned thereto are fitted while being positioned by two guide pins. Since the connector can be used to connect the optical fiber tape and to mechanically switch the state, the connector is called a MT connector. In recent years, the MT connector is practically used as a connector for connecting a four-core, eight-core, or twelve-core optical fiber tape of an accessing multi-core cable.

Further, in recent years, an MPO connector is also practically used which easily attach and detach a super multi-core cable by a push-pull operation. This connector is also used to connector twenty four cores and seventy two cores.

Specifically, as disclosed in Patent Document 1, there is known a ferrule for an optical connector which includes a fiber hole formed at a front end and is positioned to a counter ferrule by a fitting pin inserted into a guide pin hole. Here, the ferrule for the optical connector is obtained by the combination of a connection end of a part including the fiber hole and the guide pin hole with a rear portion of a main body of a part other than the connection. Then, the rear portion of the main body includes an inner space formed therein in a portion excluding the connection end, and the inner space includes a coating insertion portion and a boot insertion portion.

In both connectors disclosed in Patent Document 1, as illustrated in FIGS. 10A and 10B, an adhesive charging window portion 101 is provided in an upper surface of a ferrule body 100, a pair of left and right positioning guide pin insertion holes 102 is perforated from a front end surface to a rear end surface of the ferrule body 100, and a plurality of optical fiber insertion holes 103 is provided in parallel between both guide pin insertion holes 102 of the front end surface. Further, the rear end surface of the ferrule body 100 is provided with an insertion opening portion 104 which is opened in a rectangular shape and supports a rectangular tubular boot 106 (see FIGS. 9A and 9B) while inserting the rectangular tubular boot thereinto. Then, the rear end side of the ferrule body 100 is provided with a flange portion 105 which protrudes outward from the outer peripheral surface of the ferrule body 100.

Thus, as illustrated in FIGS. 9A and 9B, the boot 106 is formed in a rectangular tubular shape and the upper, lower, left, and right outer surfaces are formed as flat surfaces. Further, the longitudinal width and the lateral width of a front opening portion 107a which is elongated in the lateral direction at the front end of the boot 106 are set to dimensions corresponding to the thickness and the lateral width of the single mode type optical fiber tape T. Then, the longitudinal width of a rear opening portion 107b which is elongated in the lateral direction at the rear end of the boot 106 is slightly smaller than the longitudinal width of the front opening portion 107a of the front end so that only the twelve-core optical fiber F protruding from the front end of the single mode type optical fiber tape T protrudes outward.

CITATION LIST

Patent Document

Patent Document 1: JP 2001-83367 A

SUMMARY OF THE INVENTION

Problem to be Solved by the Invention

Incidentally, in the case of Patent Document 1, for example, a strong epoxy resinous adhesive is injected from the adhesive charging window portion 101 into the ferrule body 100 so as to block and cure the window portion 101 during the assembly, so that the front end of the single mode type optical fiber tape T is fixed into the ferrule body 100 together with the optical fiber F. Here, in this case, there is a concern that the adhesive may excessively leak from a gap between the insertion opening portion 104 of the rear end surface of the ferrule body 100 and the outer wall of the boot inserted into the insertion opening portion 104.

As an influence caused by the leakage of the adhesive, for example, there is a concern that a gap corresponding to the thickness of the excessive adhesive may be formed between a separate component (not illustrated) and the ferrule body 100 when the separate component is attached to a portion in which the leaking adhesive is cured. Further, since the leaking adhesive also intrudes into the pair of left and right guide pin insertion holes 102 so that the adhesive is cured therein, there is a concern that the guide pin insertion hole 102 may be blocked.

Therefore, the invention is made in view of such circumstances of the related art and an object of the invention is to provide a boot for an optical connector ferrule capable of previously preventing an adhesive charged inside a ferrule body from leaking from a gap between the boot inserted into an insertion opening portion and the insertion opening portion.

MEANS FOR SOLVING PROBLEM

In order to solve the above-described problems, according to an aspect of the invention, there is provided a boot for an optical connector ferrule including: a rear opening portion used to insert an optical fiber tape having an optical fiber at a front end thereinto; and a front opening portion used to expose the optical fiber of the front end of the inserted optical fiber tape to the outward front side, wherein the boot for the optical connector ferrule is inserted into an insertion opening portion formed at a rear end side of the optical connector ferrule, and wherein a surface of the boot is provided with a protrusion formed so as to be crushable when the protrusion is inserted into the insertion opening portion of the rear end side of the optical connector ferrule in a direction orthogonal to the boot inserting direction.

A boot for an optical connector ferrule includes a ferrule body including an insertion opening portion formed at a rear end side of the ferrule body so as to support the boot having an optical fiber at a front end while the boot is inserted into the insertion opening portion, optical fiber insertion holes formed at a front end side of the ferrule body so as to expose a front end of the optical fiber outward while the front end of the optical fiber is inserted into an inner deep portion of the insertion opening portion, and an adhesive charging window portion formed at an upper surface of the ferrule body so as to fix the optical fiber in a manner such that an adhesive is charged from the inner deep portion of the insertion opening portion to a rear end opening portion of the optical fiber insertion hole, wherein a surface of the boot is provided with a protrusion formed so as to be crushable when the protrusion is inserted into the insertion opening portion of the rear end side of the ferrule body in a direction orthogonal to the boot inserting direction.

A pair of left and right positioning guide pin insertion holes is perforated in the ferrule body from a front surface to a rear surface thereof, the optical fiber insertion holes are arranged in parallel between both guide pin insertion holes at the front surface, and the boot is provided with an adhesive storage portion formed in a concave shape at the front and rear sides of the protrusion so as to stop the adhesive injected from the adhesive charging window portion of the ferrule body and leaking from a gap between the boot and the insertion opening portion of the rear end side of the ferrule body.

An adhesive guide groove used to guide an adhesive into the adhesive storage portion is provided at the front edge side of the adhesive storage portion located at a front end of the boot.

EFFECT OF THE INVENTION

According to the invention, it is possible to provide a boot for an optical connector ferrule capable of previously preventing an adhesive charged inside a ferrule body from leaking from a gap between the boot inserted into an insertion opening portion of a rear end side of a ferrule body and the insertion opening portion.

That is, there is provided a boot for an optical connector ferrule including: a rear opening portion used to insert an optical fiber tape having an optical fiber at a front end thereinto; and a front opening portion used to expose the optical fiber of the front end of the inserted optical fiber tape to the outward front side, wherein the boot for the optical connector ferrule is inserted into an insertion opening portion formed at a rear end side of the optical connector ferrule, and wherein a surface of the boot is provided with a protrusion formed so as to be crushable when the protrusion is inserted into the insertion opening portion of the rear end side of the optical connector ferrule in a direction orthogonal to the boot inserting direction. Specifically, there is provided a boot for an optical connector ferrule including: a ferrule body including an insertion opening portion formed at a rear end side of the ferrule body so as to support the boot having an optical fiber at a front end while the boot is inserted into the insertion opening portion, optical fiber insertion holes formed at a front end side of the ferrule body so as to expose a front end of the optical fiber outward while the front end of the optical fiber is inserted into an inner deep portion of the insertion opening portion, and an adhesive charging window portion formed at an upper surface of the ferrule body so as to fix the optical fiber in a manner such that an adhesive is charged from the inner deep portion of the insertion opening portion to a rear end opening portion of the optical fiber insertion hole, wherein a surface of the boot is provided with a protrusion formed so as to be crushable when the protrusion is inserted into the insertion opening portion of the rear end side of the ferrule body in a direction orthogonal to the boot inserting direction. For this reason, even when there is a possibility that the adhesive charged inside the ferrule body leaks from a gap between the boot and the insertion opening portion of the rear end side of the ferrule body, it is possible to previously stop the adhesive by the protrusion inserted and crushed into the insertion opening portion.

Accordingly, it is possible to a conventional problem in which a gap corresponding to the thickness of the excessive adhesive is formed between the ferrule body and the separate component when the separate component is attached to the insertion opening portion of the ferrule body.

A pair of left and right positioning guide pin insertion holes is perforated in the ferrule body from a front surface to a rear surface thereof, the optical fiber insertion holes are arranged in parallel between both guide pin insertion holes at the front surface, and the boot is provided with an adhesive storage portion formed in a concave shape at the front and rear sides of the protrusion so as to stop the adhesive injected from the adhesive charging window portion of the ferrule body and leaking from a gap between the boot and the insertion opening portion of the rear end side of the ferrule body. For this reason, even when the adhesive injected from the adhesive charging window portion leaks from a gap between the boot and the insertion opening portion of the ferrule body, it is possible to previously store the adhesive by the adhesive storage portion. Accordingly, it is possible to previously prevent a conventional problem in which the leaking adhesive intrudes into the pair of left and right guide pin insertion holes. Further, when the adhesive stopped in the adhesive storage portion is cured, the boot can be strongly (powerfully) fixed to the ferrule body.

An adhesive guide groove used to guide an adhesive into the adhesive storage portion is provided at the front edge side of the adhesive storage portion located at a front end of the boot. For this reason, when the adhesive is guided into the adhesive storage portion located at the front end side of the upper surface through the adhesive guide groove, the adhesive is charged in a substantial T-shape in the top view. Accordingly, the boot is not reliably separated from the insertion opening portion of the rear end side of the ferrule body.

BRIEF DESCRIPTION OF DRAWINGS

FIG. 1A is a perspective view when viewed from the front oblique side and FIG. 1B is a perspective view when viewed from the rear oblique side;

FIGS. 2A to 2E illustrate the same boot, where FIG. 2A is a top view, FIG. 2B is a side view, FIG. 2C is a bottom view, FIG. 2D is a front view, and FIG. 2E is a rear view;

FIG. 3A is a cross-sectional view taken along the line A-A of FIG. 2A and FIG. 3B is a cross-sectional view taken along the line B-B of FIG. 2B;

FIG. 4A is a top view and FIG. 4B is a cross-sectional view taken along the line C-C of FIG. 3A;

FIG. 9A is a perspective view when viewed from the front oblique side and FIG. 9B is a perspective view when viewed from the rear oblique side; FIG. 10A is a perspective view when viewed from the rear oblique side and FIG. 10B is a side cross-sectional view.

MODE(S) FOR CARRYING OUT THE INVENTION

Figure 1A:
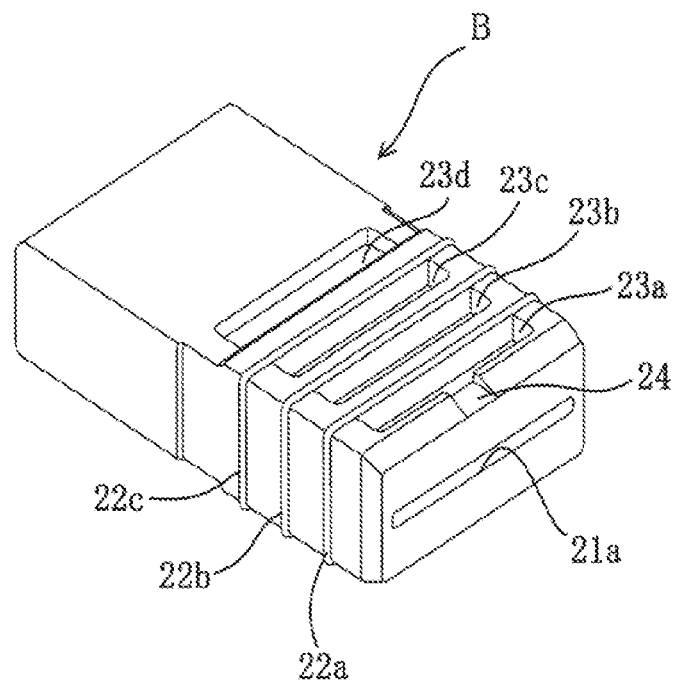
FIGS. 1A and 1B illustrate a boot of an embodiment of the invention, where
Figure 1B:
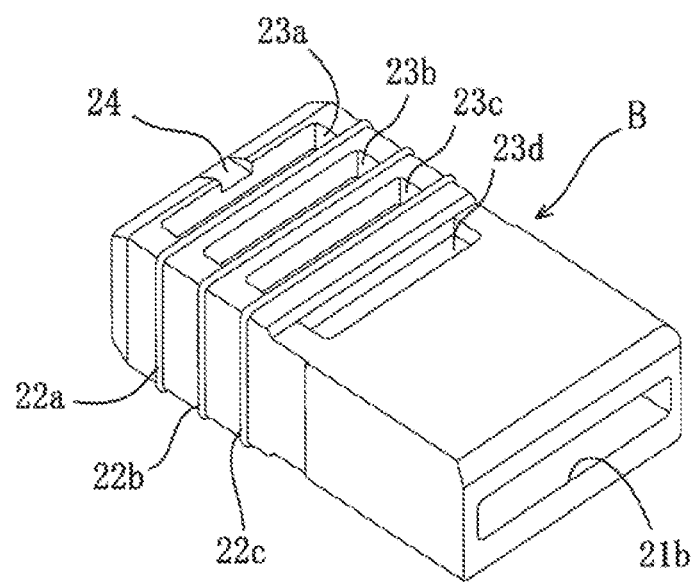
Figure 3A:
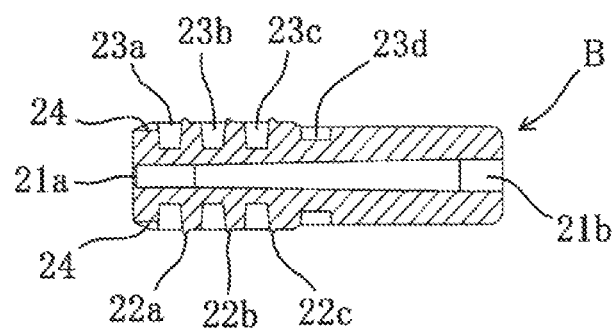
FIGS. 3A and 3B illustrate the same boot, where
Figure 3B:
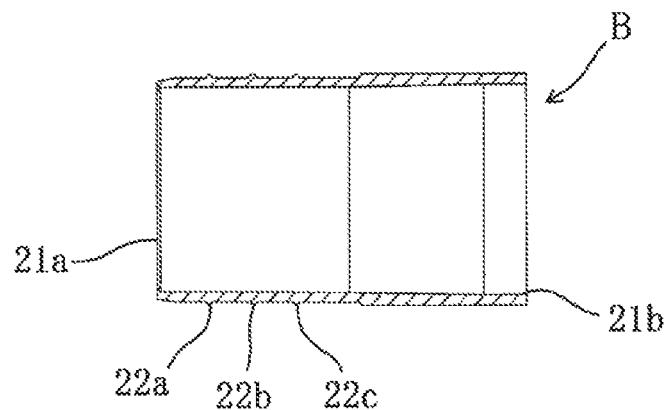

Hereinafter, an embodiment of the invention will be described in detail with reference to the drawings.

In the embodiment, as illustrated in FIGS. 4A to 8, an optical connector ferrule for forming a multifiber connector according to the invention is formed as a ferrule body 10 which is molded in a substantially rectangular casing shape by resin, is used as a multi-core MT connector capable of connecting a highly dense multi-core cable, and stores a twelve-core single mode type optical fiber tape T. As a connection method, the ferrule bodies 10 each having the multi-core optical fiber positioned therein are aligned and fitted to each other along two guide pins.

Furthermore, in the description below, the MT connector with the above-described configuration will be described, but the invention is not limited thereto. That is, the invention can be applied to, for example, a MT connector connecting a highly dense multi-core cable storing a four-core or eight-core single mode type optical fiber tape T and a MPO connector easily attached and detached by a push-pull operation so as to connect a super multi-core cable and serving as a multi-core connector such as a sixteen-core or eighty-core connector.

<Configuration of Boot>

For example, a substantially square tubular boot B, into which a single mode type optical fiber tape T obtained by binding a twelve-core optical fiber F by a tape is inserted and fixed, is attached to an insertion opening portion 14 which is opened in a rectangular shape and is formed at the rear end surface side of the ferrule body 10.

Hereinafter, the detailed configuration of the boot B will be described. As illustrated in FIGS. 1A, 1B, 2D, 2E, and 3A, the longitudinal width and the lateral width of a front opening portion 21a which is elongated in the lateral direction and is located at the front end of the boot B are set to a dimension corresponding to the thickness and the lateral width of the single mode type optical fiber tape T. Then, the longitudinal width of a rear opening portion 21b which is elongated in the lateral direction and is located at the rear end of the boot B is slightly larger than the longitudinal width of the front opening portion 21a of the front end so that, for example, only the twelve-core optical fiber F protruding from the front end of the single mode type optical fiber tape T protrudes outward.

Further, as illustrated in FIGS. 1A, 1B, 2A, 2B, 2C, 3A, and 3B, three protrusions 22a, 22b, and 22c are formed in the entire circumference of the boot B in a direction orthogonal to the insertion direction of the boot B so as to be crushable while being inserted into the insertion opening portion 14 formed at the rear end side of the ferrule body 10. Furthermore, three protrusions 22a, 22b, and 22c may be provided as one or two protrusions or four or more protrusions. Further, the protrusions 22a, 22b, and 22c are formed along the entire circumference of the boot B in the drawings, but may be formed only at the upper and lower surfaces.

Further, as illustrated in FIGS. 1A, 1B, 2A, 2C, and 3A, four rectangular groove-shaped adhesive storage portions 23a, 23b, 23c, and 23d are formed so as to be respectively adjacent to the front and rear sides of the protrusions 22a, 22b, and 22c at the upper and lower symmetrical positions of the surface of the boot B. Accordingly, it is possible to stop an adhesive V which is injected from an adhesive charging window portion 11 (to be described below) of the ferrule body 10 and leaking from a gap between the boot B and the insertion opening portion 14 of the ferrule body 10. Specifically, the first protrusion 22a is formed so as to be adjacent to the rear edge side of the foremost adhesive storage portion 23a, the second protrusion 22b is formed so as to be adjacent to the rear edge side of the adhesive storage portion 23b located at the second position at the rear side, and the third protrusion 22c is formed so as to be adjacent to the rear edge side of the adhesive storage portion 23c located at the third position at the rear side.

The protrusions 22a, 22b, and 22c which are formed in the boot B as described above are formed as "dams" multiply disposed in parallel through the rectangular groove-shaped adhesive storage portions 23a, 23b, 23c, and 23d and block a gap between the boot B and the ferrule body 10. As described above, the longitudinal and lateral width dimensions of the insertion opening portion 14 of the ferrule body 10 are set to be substantially equal to or slightly larger than the longitudinal and lateral width dimensions of the boot B. Then, the height from the surface of the boot B when the boot B is inserted into the insertion opening portion 14 of the ferrule body 10 is set to, for example, about 0.1 to 0.5 mm in response to the longitudinal and lateral width dimensions of the boot B so that the protrusions 22a, 22b, and 22c are easily crushed to an arbitrary height (see FIGS. 7 and 8).

Of course, this height does not limit the technical scope of the invention.

Figure 7:
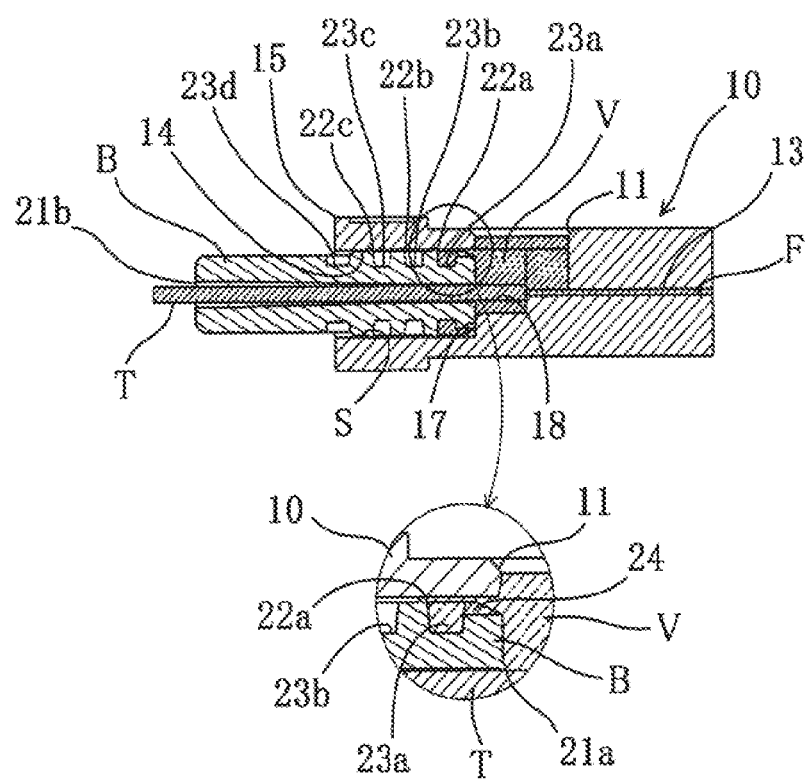
FIG. 7 is a side cross-sectional view illustrating a state where the boot for the optical connector ferrule is assembled and used.

Further, as illustrated in FIGS. 2A, 2C, and 7, an adhesive guide groove 24 which guides the adhesive V into the adhesive storage portion 23a is provided at the center of the front edge side (in the drawings, a portion formed as a forward downward inclined surface) of the adhesive storage portion 23a located at the foremost end side of both upper and lower surfaces of the boot B. When the adhesive V is guided into the adhesive storage portion 23a through the adhesive guide groove 24, the adhesive V is charged in a substantially T-shape in the top view.

<Configuration of Ferrule Body>

Figure 4A:
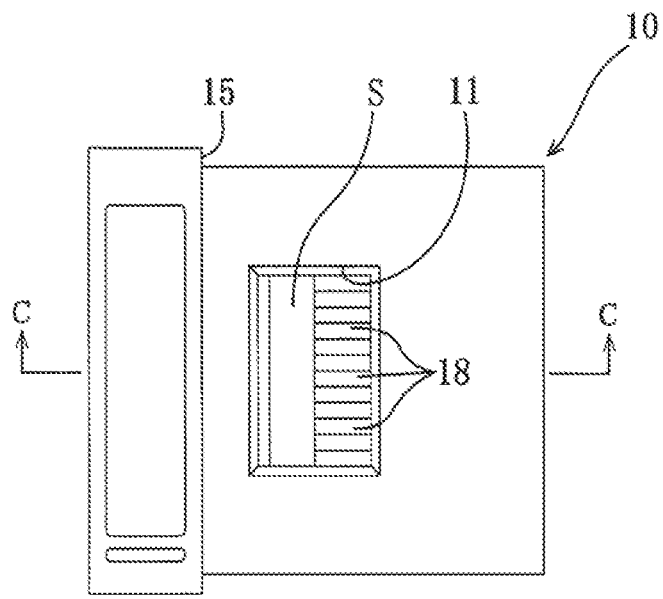
FIGS. 4A and 4B illustrate an optical connector ferrule, where
Figure 4B:
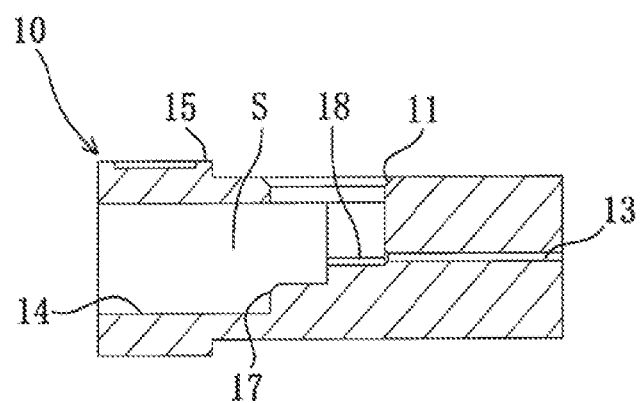

The detailed configuration of the ferrule body 10 will be described. As illustrated in FIGS. 4A and 4B, the insertion opening portion 14 which is opened in a rectangular shape and is used to attach the substantially square tubular boot B into which the single mode type optical fiber tape T obtained by binding the twelve-core optical fiber F by a tape is inserted and fixed is provided at the rear end surface side of the ferrule body 10. The inside of the ferrule body 10 is formed as a storage space S of the boot B so that a part (a substantial half) of the front end side of the boot B is stored through the insertion opening portion 14.

Further, as illustrated in FIGS. 4B, 6, 7, and 8, optical fiber insertion holes 13 which are formed as twelve small holes are perforated in the front end surface side of the ferrule body 10 to the position of the inner deep portion (the front end inner wall of the storage space S of the boot B) of the insertion opening portion 14 of the ferrule body 10. Accordingly, the optical fiber insertion holes 13 communicate with the storage space S of the boot B.

In the example illustrated in the drawings (see FIGS. 4B and 7), a step portion 17 is formed at a position near the inner deep portion of the storage space S so as to face the position of the rear edge portion of the adhesive charging window portion 11 to be described later. Then, the lower portion of the front end surface of the inserted boot B is locked to the near side of the adhesive charging window portion 11 by the step portion 17. At this time, the front end of the twelve-core optical fiber F which protrudes from the front end side of the single mode type optical fiber tape T is inserted into twelve optical fiber insertion holes 13 from the inside of the storage space S of the boot B and the end face of the front end is exposed to the front end side of the ferrule body 10.

That is, the adhesive charging window portion 11 which is opened in a substantially rectangular shape is perforated at the substantial center of the upper surface of the ferrule body 10. Here, a half of the upper portion of the ferrule body 10 from the inner deep portion (the inner wall of the front end of the storage space S of the boot B) of the insertion opening portion 14 of the ferrule body 10 to the rear end opening portions of twelve optical fiber insertion holes 13 is cut out, and twelve U-shaped guide grooves 18 are formed from the rear end opening portion of the optical fiber insertion hole 13 to a position facing the substantial center of the adhesive charging window portion 11 (see FIGS. 4B and 7).

In FIG. 4A, the rear end opening portion of the optical fiber insertion hole 13 and the U-shaped guide groove 18 are visible through the adhesive charging window portion 11. For example, when an epoxy resinous adhesive V is injected from the adhesive charging window portion 11 in a state where the boot B is attached to the insertion opening portion 14 of the ferrule body 10 and the front end side of the optical fiber F is inserted into the optical fiber insertion hole 13, the optical fiber F, that is, the base portion of the twelve-core optical fiber F protruding from the front end side of the single mode type optical fiber tape T is fixed to the ferrule body 10.

Figure 5:
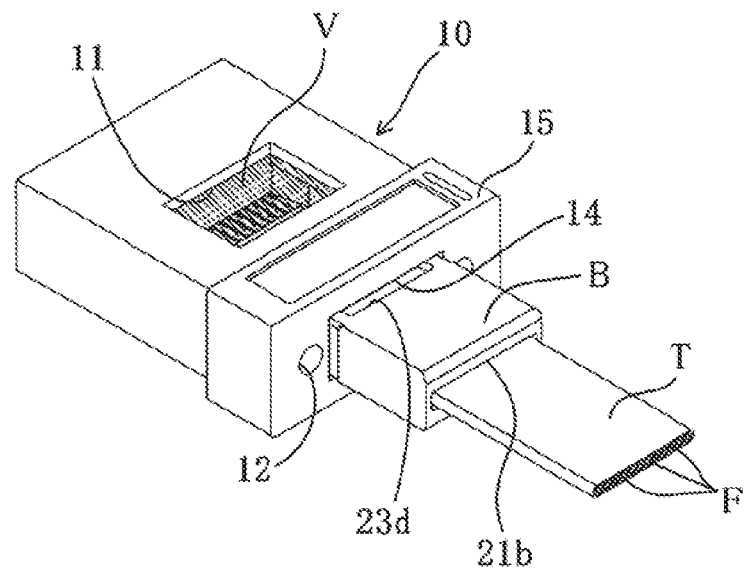
FIG. 5 is a perspective view illustrating a state where the boot for the optical connector ferrule is assembled when viewed from the rear oblique side.
Figure 6:
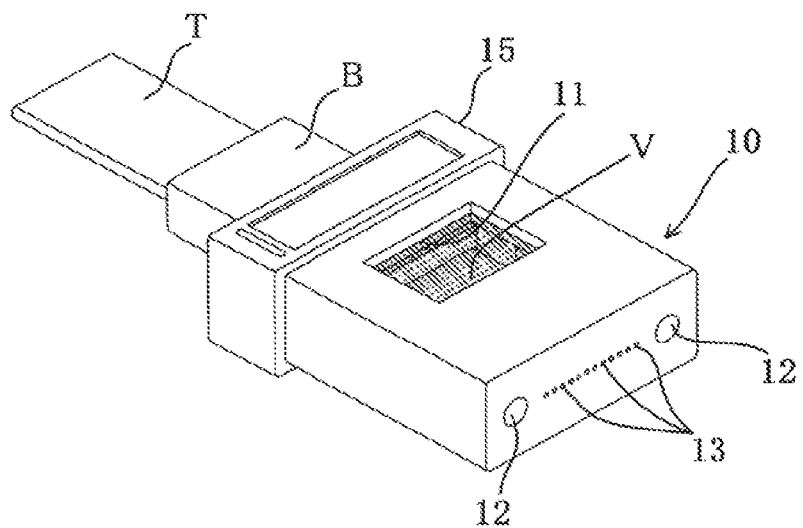
FIG. 6 is a perspective view illustrating a state where the boot for the optical connector ferrule is assembled when viewed from the front oblique side.
Figure 8:
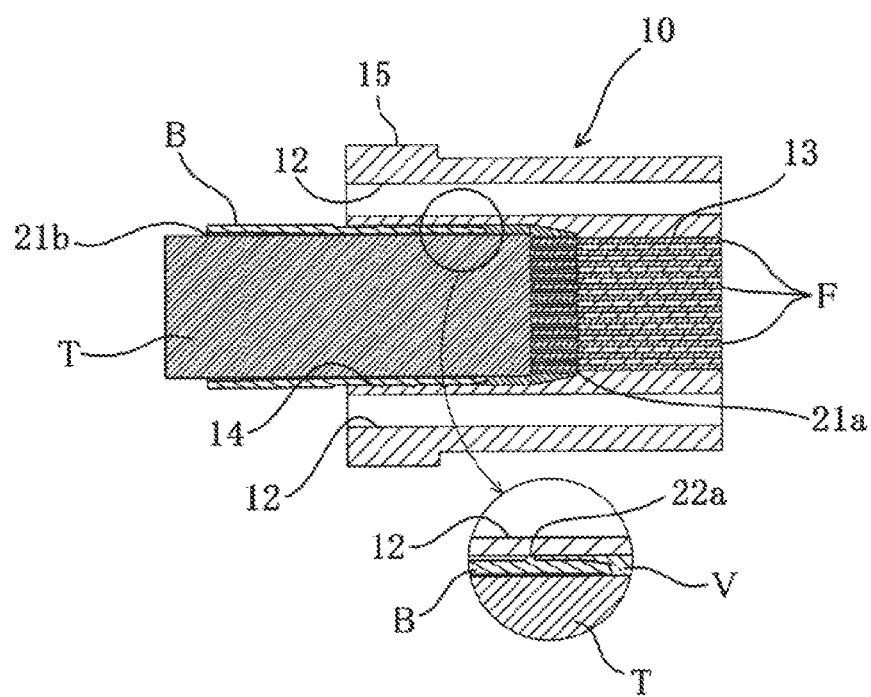
FIG. 8 is a top cross-sectional view illustrating a state where the boot for the optical connector ferrule is assembled and used.
Figure 9A:
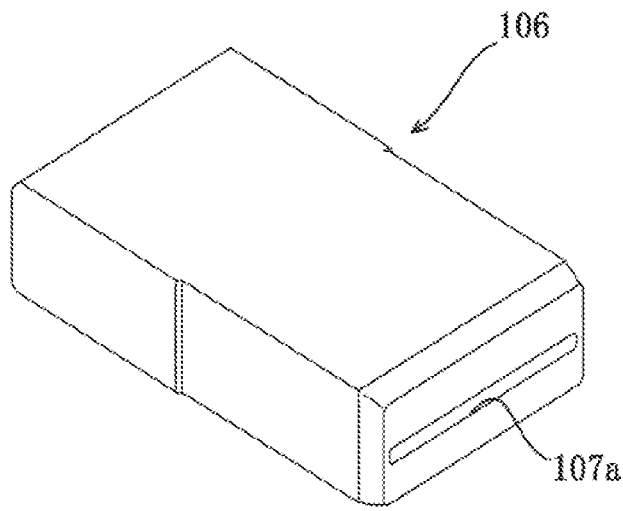
FIGS. 9A and 9B illustrate a boot of the related art, where
Figure 9B:
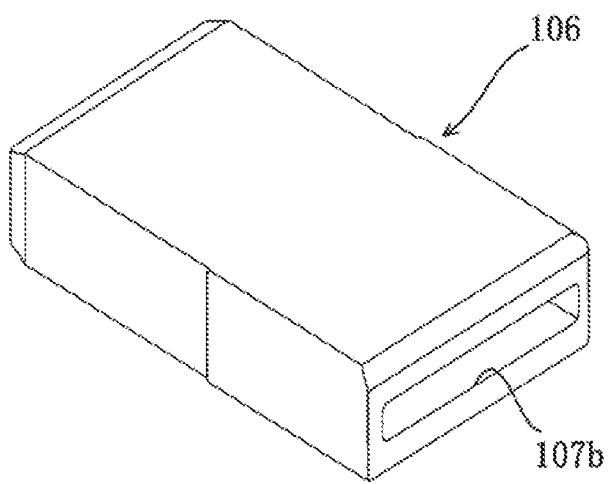
Figure 10A:
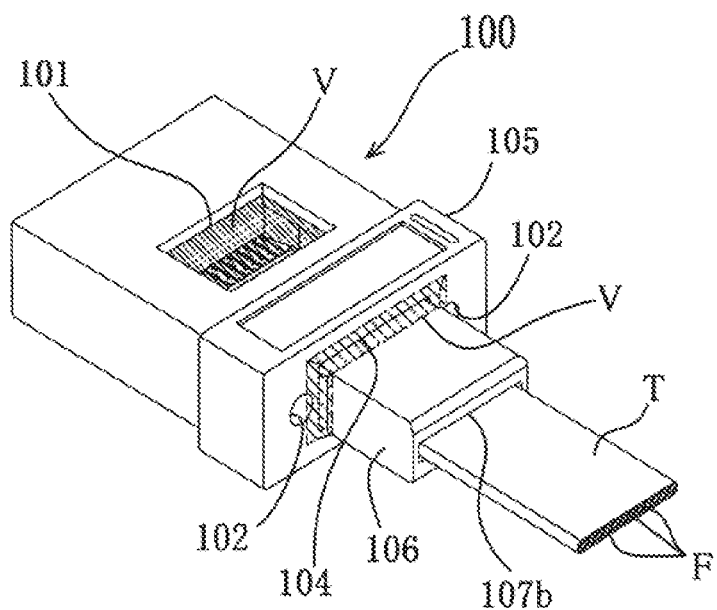
FIGS. 10A and 10B illustrate a state where the boot for the optical connector ferrule of the related art is assembled and used, where
Figure 10B:
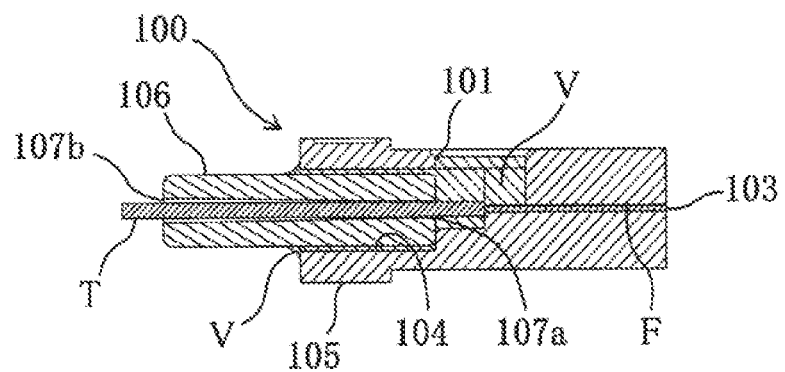

Further, as illustrated in FIGS. 5, 6, and 8, a pair of left and right positioning guide pin insertion holes 12 is perforated from the front end surface to the rear end surface of the ferrule body 10, and twelve optical fiber insertion holes 13 are arranged in series in the lateral direction between both guide pin insertion holes 12 at the front end surface of the ferrule body 10.

Furthermore, as illustrated in FIGS. 4A to 8, the rear end side of the ferrule body 10 is provided with a flange portion 15 which protrudes outward from the outer peripheral surface of the ferrule body 10.

Next, an example in which the ferrule having the above-described configuration is assembled and used will be described.

As illustrated in FIGS. 4A to 7, the boot B to which the single mode type optical fiber tape T obtained by binding the twelve-core optical fiber F by a tape is attached is inserted into the insertion opening portion 14 of the ferrule body 10. At this time, each of three protrusions 22a, 22b, and 22c is crushed to an arbitrary height so as to block a gap between the boot B and the ferrule body 10.

Then, the lower portion of the front end surface of the boot B inserted as described above is locked to the near side of the adhesive charging window portion 11 by the step portion 17 inside the storage space S of the ferrule body 10 and the front end side of the twelve-core optical fiber F at the front end side of the single mode type optical fiber tape T is inserted into twelve optical fiber insertion holes 13 along the U-shaped guide groove 18 so that the end surface of the front end is exposed to the front surface side of the ferrule body 10.

Subsequently, when the adhesive V is injected from the adhesive charging window portion 11 of the ferrule body 10, the base portion of the twelve-core optical fiber F protruding from the front end side of the single mode type optical fiber tape T is bonded and integrated to the ferrule body 10, and the base portion the optical fiber F protruding from the front end of the single mode type optical fiber tape T is fixed by the adhesive V together with the front end of the single mode type optical fiber tape T. At this time, the adhesive V is guided into the adhesive storage portion 23a located at the foremost end side of the upper and lower surfaces of the boot B through the adhesive guide groove 24 provided at the center of the boot B, so that the adhesive V is charged in charged in a substantial T-shape in the top view.

Thus, although there is a possibility that the adhesive V may leak out from a gap between the boot B and the insertion opening portion 14 of the ferrule body 10 when the adhesive V is injected from the adhesive charging window portion 11, the adhesive V can be previously stopped by the protrusions 22a, 22b, and 22c inserted and crushed into the insertion opening portion 14 so as to be bitten into the inner wall of the insertion opening portion 14. Further, although there is a possibility that the adhesive V starts to leak out from a certain portion, the adhesive V can be completely stopped by the adhesive storage portions 23a, 23b, 23c, and 23d (particularly, the backmost adhesive storage portion 23d). Accordingly, it is possible to previously prevent a conventional problem in which the leaking adhesive V intrudes into the pair of left and right guide pin insertion holes 12.

In addition, only MT connectors have been described above, but the invention can be also applied to the other multifiber optical connectors.

What is claimed is:

1. A boot for an optical connector ferrule comprising:
   a rear opening portion configured for an insertion of an optical fiber tape having an optical fiber at a front end thereinto; and
   a front opening portion configured to expose the optical fiber of the front end of the inserted optical fiber tape to the outward front side,
   wherein the boot for the optical connector ferrule is configured to be insertable into an insertion opening portion formed at a rear end side of the optical connector ferrule, and
   wherein a surface of the boot is provided with at least two protrusions configured to be crushable when the boot having the at least two protrusions is inserted into the insertion opening portion of the rear end side of the optical connector ferrule in a direction orthogonal to the boot inserting direction so as to stop adhesive injected into the optical connector ferrule from leaking.

2. The boot for the optical connector ferrule according to claim 1,
   wherein a pair of left and right positioning guide pin insertion holes is perforated in the ferrule body from a front surface to a rear surface thereof, the optical fiber insertion holes are arranged in parallel between both guide pin insertion holes at the front surface, and the boot is provided with an adhesive storage portion formed in a concave shape at the front and rear sides of the protrusion so as to stop the adhesive injected from the adhesive charging window portion of the ferrule body and leaking from a gap between the boot and the insertion opening portion of the rear end side of the ferrule body.

3. The boot for the optical connector ferrule according to claim 2,
wherein an adhesive guide groove used to guide an adhesive into the adhesive storage portion is provided at the front edge side of the adhesive storage portion located at a front end of the boot.

4. A boot for an optical connector ferrule comprising:
a rear opening portion configured for an insertion of an optical fiber tape having an optical fiber at a front end thereinto; and
a front opening portion configured to expose the optical fiber of the front end of the inserted optical fiber tape to the outward front side,
wherein the boot for the optical connector ferrule is configured to be insertable into an insertion opening portion formed at a rear end side of the optical connector ferrule, and
wherein a surface of the boot is provided with a protrusion configured to be crushable when the boot having the protrusion is inserted into the insertion opening portion of the rear end side of the optical connector ferrule in a direction orthogonal to the boot inserting direction so as to stop adhesive injected into the optical connector ferrule from leaking, and
wherein an adhesive guide groove used to guide an adhesive into the adhesive storage portion is provided at the front edge side of the adhesive storage portion located at a front end of the boot.

* * * * *